US006602374B2

(12) United States Patent
Gunther et al.

(10) Patent No.: US 6,602,374 B2
(45) Date of Patent: Aug. 5, 2003

(54) SYSTEM AND METHOD FOR CREATING COIL OF STAMPS WITH INNER SECURITY STRIP

(75) Inventors: William G. Gunther, Guilford, CT (US); Anthony A. Penati, Killingworth, CT (US)

(73) Assignee: George Schmitt & Company, Inc., Branford, CT (US)

(*) Notice: Subject to any disclaimer, the term of this patent is extended or adjusted under 35 U.S.C. 154(b) by 40 days.

(21) Appl. No.: 10/008,684

(22) Filed: Dec. 7, 2001

(65) Prior Publication Data

US 2002/0069973 A1 Jun. 13, 2002

Related U.S. Application Data

(60) Provisional application No. 60/245,395, filed on Dec. 8, 2000.

(51) Int. Cl.[7] ......................... B32B 31/10; B32B 31/12; B32B 31/18

(52) U.S. Cl. ....................... 156/192; 156/265; 156/270; 156/308.4; 156/308.8; 156/308.9; 156/320; 156/380.9; 156/459; 156/519; 156/522; 156/529; 156/552; 156/578

(58) Field of Search ................................ 156/184, 191, 156/192, 265, 270, 308.8, 309.9, 308.4, 459, 380.9, 519, 522, 529, 578, 510, 552

(56) References Cited

U.S. PATENT DOCUMENTS

| | | | | |
|---|---|---|---|---|
| 3,932,259 | A | * | 1/1976 | Marini et al. |
| 5,513,478 | A | * | 5/1996 | Abt |
| 5,663,227 | A | * | 9/1997 | Birkholz et al. |
| 5,902,439 | A | * | 5/1999 | Pike et al. |
| 6,130,613 | A | * | 10/2000 | Eberhardt et al. |
| 6,203,067 | B1 | * | 3/2001 | Shipston et al. |
| 2002/0056515 | A1 | * | 5/2002 | Penati et al. |

* cited by examiner

*Primary Examiner*—Curtis Mayes
(74) *Attorney, Agent, or Firm*—St. Onge Steward Johnston & Reens LLC

(57) ABSTRACT

A system for creating a coil of stamps from a web of stamps is provided. The system includes a security strip feeder which feeds a security strip having first and second sections. A first activator activates only the first section, and an applicator applies the security strip to contact the web of stamps. Thus, the activated first section adheres to the web of stamps, while the second section does not. A cutter cuts the web of stamps into a strip of stamps in a position such that at least a portion of the second section extends beyond the strip of stamps, and a second activator activates the portion of the second section extending beyond the strip. A coiler coils the strip into a coil such that the activated portion of the second section contacts and adheres onto an inner spire of the coil or back onto itself.

27 Claims, 4 Drawing Sheets

SYSTEM AND METHOD FOR CREATING COIL OF STAMPS WITH INNER SECURITY STRIP

RELATED APPLICATIONS

This patent application claims the benefit, under Title 35, United States Code, §119(e), of United States Provisional Patent Application No. 60/245,395, filed Dec. 8, 2000.

FIELD OF THE INVENTION

The present invention relates to a coil of stamps, and more particularly to a system for producing a coil of stamps which incorporates security features which inhibit the unnoticed and unauthorized removal of one or more stamps from the coil.

BACKGROUND OF THE INVENTION

It has long been known to roll a strip of stamps into a coil to save space and to provide a convenient mechanism for detaching one or more stamps from a plurality of others. Such a coil configuration has been used with traditionally known stamps which required moistening on the glue side before being adhered to an envelope, and more recently, with so-called "self adhesive" stamps which do not have to be moistened, but rather are provided with a pressure sensitive adhesive layer which is adhered to the envelope. In the latter case, the pressure sensitive adhesive layer is typically covered with a protective backing, or liner, consisting of a strip of non-adhesive material, generally of the same width as or wider than the strip of stamps, which is peeled away before the stamp is adhered to the envelope in order to expose the adhesive layer on the back of the stamp.

Traditionally, coils of stamps had been individually sealed on the outside (outer side) typically with a band or strip of appropriate length applied at the moment of rolling the strips of stamps into a coil.

Such a band is typically applied in a manner to interleave it with the last few spires (outer spires) of the coil, the band being long enough to extend past the last stamp of the coil; the outer stamp of the coil and the first one to be unrolled from the coil; and long enough to overlap on itself around the coil of stamps. Being such a band covered (coated) at least on one side with either a heat activated adhesive or a moisture activated adhesive, such adhesive was then properly activated in a defined spot (position) such as to allow the band to seal to itself in a portion of the overlapping area. A band or strip so applied and sealed prevents the unrolling of the coil of stamps and therefore it prevents, unless broken, the removal of one or more stamps from the outside of the coil of stamps. A coil of stamps with such outside band applied and sealed guarantees that the coil had not been unrolled and guarantees that no stamps have been removed from the outside of the coil. It is worth noting, however, that the same is not true for the inside (inner end) of the same coil of stamps.

Moreover, traditionally, coils of stamps had been packaged in trays. Each tray consisting of a multitude of individual cells each individually complete on the sides and bottom but not on the top, and each separable from the others but connected with the others to form the tray. Each coil was deposited in a separate cell of the tray and a layer of material, generally film, transparent or not transparent, printed or unprinted, was then deposited on top of the tray, thus providing the top of each of the cells, and sealed to the tray cells thus defining a multitude of separate cells, each cell containing one, and one only, coil and each cell individually and completely enclosed and sealed all around, at the moment of the original packaging. In order to facilitate the separation of the individual cells a convenient grid of perforations was then typically applied to the tray allowing the separation of any individual cell still maintaining the cell individually complete and sealed. Access to the coil of stamps inside the cell was only possible by breaking the seal. Therefore an unbroken sealed cell guarantees to contain a complete original untampered coil of stamps. The trays typically would be distributed to U.S. Post Office branch locations, where they would be stored in drawers. When a customer purchased a coil, the cell could be separated from the tray, and given to the customer. Before use, the cell would be opened by the customer, thereby ensuring that no stamps were removed from the coil before being sold to the customer.

While the above-described packaging system offers excellent security, it suffers from a number of disadvantages. One of these disadvantages relates to the space required for storage. Typically, because of the size of the trays, very few of them could be fit into the drawers, and in some cases, it may be difficult to even fit a single tray into a drawer. This would require postal employees to frequently be required to restock the drawers, a time-wasting process. Moreover, the large size of the trays increases the warehousing cost of bulk skids and shipping charges from manufacturing facilities to Post Office branch offices. Another disadvantage relates to the amount of material required to form the trays. The large amount of material makes the trays relatively costly to produce, and creates environmental concerns.

A novel packing system to remedy these disadvantages has been developed by George Schmitt & Company, Inc., assignee of the present application, and is described in detail in U.S. patent application Ser. No. 10/032,961, filed Oct. 24, 2001, and incorporated herein by reference. Referring first to FIG. 1, a cylinder or stick of coils 10 of stamps is shown, the coils of stamps being in alignment along a common axis 12. The cylinder is wrapped with a shrink wrap tubing 14 (better seen in FIG. 2), and then heat is applied to shrink the tubing to mold to stamp coils 10 on the outside, thereby holding the coils together in a cylinder or stick.

Shrink wrap tubing 14 comprises a single piece of shrink wrap material having a plurality of cross perforation lines 16 therein, and at least one longitudinal perforation line 18 therein. Cross perforation lines 16 are placed so as to be adjacent to the mating surfaces of adjacent coils 10 once tubing is shrunk therearound. This allows one or more stamp coils 10 to be separated from the stick, while the portion of shrink wrap tubing 14 around the respective coils remains intact. The number of cross perforation lines 16 provided is dependent upon the number of stamp coils 10 to be packaged together. Although five coils are shown in the figures, it should be understood that a greater or fewer number of coils may be provided. Longitudinal perforation lines 18 are provided so that shrink wrap tubing may be easily removed from stamp coils 10 when such is desired. Although one longitudinal perforation line 18 is sufficient for such, it has been found that providing two longitudinal perforation lines 18 provides improved results.

Using the above-described packaging system, it has been found that twice as many coils of stamps can be stored in the space utilized by known tray designs. However, when the above described packaging system is used with traditionally known coils of stamps which require moistening or with self adhesive stamps having a protective backing, or liner, a security issue may arise. More specifically, the coils of stamps are individually sealed on the outside both by the sealed band applied at the moment of the rolling of the coil and by the outside shrink wrap material. However, they are not individually sealed on the inside, inner side of the coil, and the integrity of the coil of stamps may be compromised. It is indeed possible to remove one or more stamps from the inner end of a coil of stamps 10, either separated from the stick while the portion of shrink wrap tubing 14 around the coil remains intact, or still connected with other coils of the stick while the shrink wrap tubing 14 around the stick remains intact, without affecting the appearance of the coil or breaking the sealed band or the shrink wrap tubing around the coil. The consumer or any other person would not be able to easily tell if such tampering has occurred unless the number of stamps on the coil were counted.

What is desired, therefore, is a system for creating a coil of stamps which inhibits the unnoticed and unauthorized removal of one or more stamps from the coil itself, either from the outer spires or from the inner spires, thus allowing, among other advantages, a plurality of coils to be packaged as a stick and wrapped on the outside with a shrink wrap tubing, while still ensuring the customer that no stamps were removed from any of the coil before being sold to the customer. A method of making such a coil of stamps is also desired.

SUMMARY OF THE INVENTION

Accordingly, it is an object of the present invention to provide a system for creating a coil of stamps which inhibits the unnoticed and unauthorized removal of one or more stamps from the coil itself.

Another object of the present invention is to provide system for creating a coil of stamps having the above characteristics and which inhibits the unnoticed and unauthorized removal of stamps both from the outer spires and from the inner spires.

A further object of the present invention is to provide a system for creating a coil of stamps having the above characteristics and which allows a plurality of coils to be packaged as a stick and wrapped on the outside with a shrink wrap tubing, while still ensuring the customer that no stamps were removed from any of the coil before being sold to the customer.

Still another object of the present invention is to provide a method for making a coil of stamps having the above characteristics.

These and other objects of the present invention are achieved by provision of a system for creating a coil of stamps from a web of stamps, which coil inhibits the unnoticed and unauthorized removal of one or more stamps from the coil. The system includes a security strip feeder which feeds a security strip having a first section and a second section. A first activator activates only the first section of the security strip, and an applicator applies the security strip to contact the web of stamps. Thus, the activated first section of the security strip adheres to the web of stamps, while the second section of the security strip does not adhere to the web of stamps. A cutter cuts the web of stamps into a strip of stamps in a position such that at least a portion of the second section extends beyond the strip of stamps, and a second activator activates the portion of the second section of the security strip extending beyond the strip of stamps. A coiler coils the strip of stamps into a coil of stamps such that the activated portion of the second section of the security strip contacts and adheres onto an inner spire of the coil of stamps or back onto itself.

In one embodiment, the web of stamps may comprise a web of stamps having a pressure sensitive adhesive applied thereto which is covered by a backing layer, or a web of stamps having a moisture activated adhesive applied thereto. In these cases case, the security strip may have a delayed reaction heat activated adhesive applied thereto, and the first activator and said second activator may comprise heat sources, preferably heat lamps, which activate the delayed reaction heat activated adhesive. The security strip may alternatively have a moisture activated adhesive applied thereto, and the first activator and the second activator may comprise moisture sources which activate the moisture activated adhesive.

In another embodiment, applicable to the case where the web of stamps comprises a web of stamps having a moisture activated adhesive applied thereto, the first activator and the second activator may comprise moisture sources which apply moisture to the security strip which moisture activates the moisture activated adhesive when the moistened security strip contacts the moisture activated adhesive.

Preferably, the security strip feeder includes a first cutting mechanism which cuts the security strip from a length of security strip material. It is also preferable that the first activator includes a blocking member which blocks the second portion of the security strip from being activated during activation of the first portion of the security strip.

When coils of stamps are rewound in one or multiple streams, a second cutter cuts the web of stamps into a strip of stamps in a position such that at least a portion of the second section of the security strip extends beyond the strip of stamps. Preferably, such a cutter comprises a bursting blade extending across a width of the web of stamps, the bursting blade having a narrow tip and being movable substantially perpendicular to the web of stamps such that when moved fully toward the web of stamps, the bursting blade breaks a plane formed by the web of stamps. The bursting blade is moved forcefully toward the web of stamps adjacent to a perforation in the web of stamps in order to burst the perforation and separate a strip of stamps from the remainder of the web of stamps.

The invention and its particular features and advantages will become more apparent from the following detailed description considered with reference to the accompanying drawings.

DETAILED DESCRIPTION OF THE INVENTION

Figure 1:
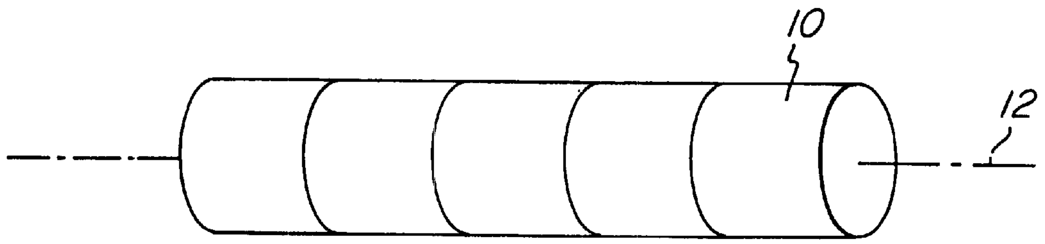
FIG. 1 (PRIOR ART)
FIG. 1 is a side isometric view illustrating a prior art packaging arrangement of a plurality of coils of stamps.
Figure 2:
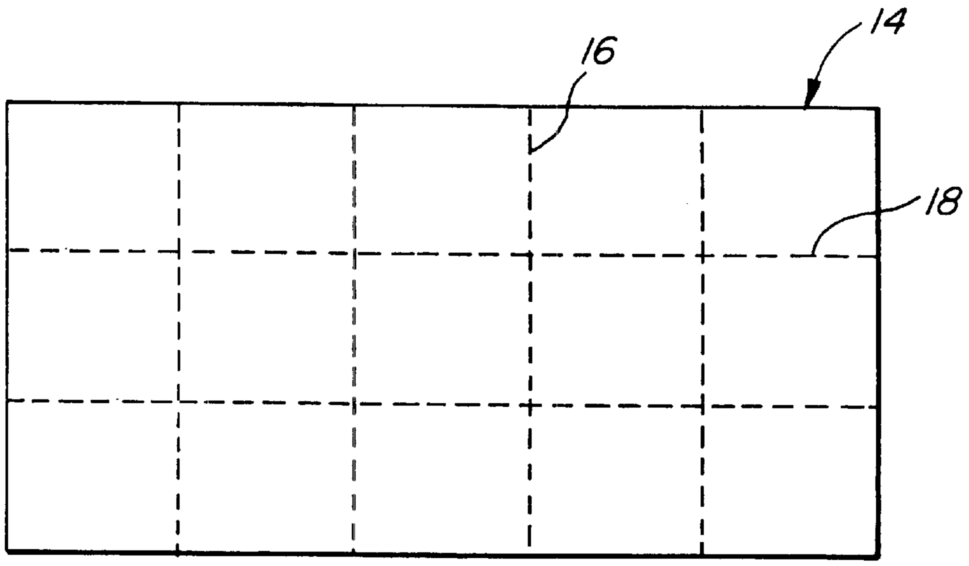
FIG. 2 (PRIOR ART)
FIG. 2 is a plan view illustrating a sleeve used in the prior art packaging arrangement of FIG. 1.
Figure 3:
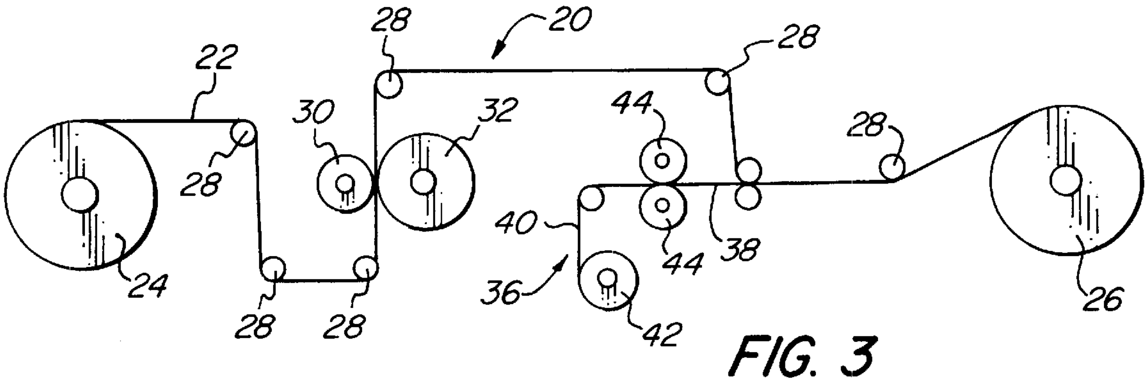
FIG. 3 is a schematic side view of a system for creating a coil of stamps, which coil inhibits the unnoticed and unauthorized removal of one or more stamps from the inner end of the coil, in accordance with the present invention.
Figure 4:
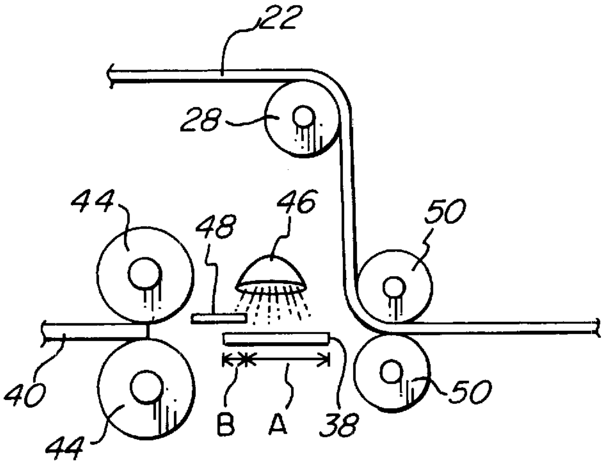
FIG. 4 is a side schematic view showing in greater detail a portion of the system for creating a coil of stamps of FIG. 3.

Referring now to FIG. 3, an overall system 20 for creating a coil of stamps, which coil inhibits the unnoticed and unauthorized removal of one or more stamps from the inner end of the coil, in accordance with the present invention is shown. A web of contiguous strips of stamps 22 is wound around an input spool 24 and an output spool 26. Various rollers 28 are provided throughout system 20 in order to direct the web of stamps 22 to the proper positions. It should be noted that the web of stamps 22 has already been printed, and either a pressure sensitive adhesive covered by a protective backing or a moisture activated glue has already been applied to one side thereof.

Figure 5:
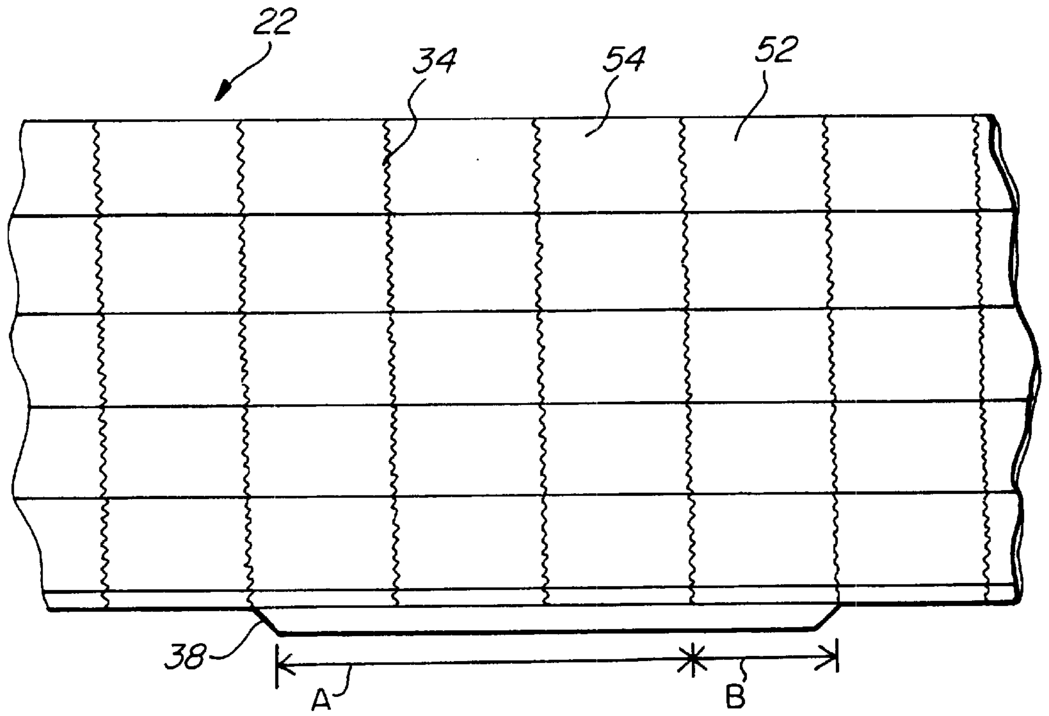
FIG. 5 is a top isometric view illustrating a section of a web of contiguous strips of stamps having a security strip partially adhered applied.

The web of stamps 22 is fed through a cooperating anvil 30 and die 32, which are provided in order to create perforations 34 (see FIG. 5) in web 22, as is known in the art. Die 32 essentially comprises a cylindrical drum having a plurality of protrusions shaped so as to form perforations. Die 32 is pressed against cylindrical anvil 30 with great force with web of stamps 22 passing therebetween in order to create perforations 34 in web 22. As die 32 and the operation thereof is essentially known in the art, it is not described in further detail herein.

Web of stamps 22 is also fed past a mechanism 36 by which a security strip 38 may be affixed thereto. Security strip material 40 may be provided on a spool 42, and passed through cooperating cutting rollers 44 which cut security strip material 40 into appropriate sized pieces security strips 38. After a security strip 38 is cut, a portion thereof is adhered to web of stamps 22. This may be accomplished in different ways depending upon whether the web of stamps 22 is a web of self-adhesive stamps having a protective backing layer or a web of moisture activated stamps.

If web of stamps 22 is a web of self-adhesive stamps having a protective backing layer, security strip material 40 is provided on its surface facing web of stamps 22 with either a delayed reaction heat activated adhesive or a moisture activated adhesive. After security strip 38 is cut, the adhesive on a portion A of the security strip 38 is activated by heating it with a heat lamp 46, or some other type of infrared or radiant heat source, if a delayed reaction heat-activated adhesive is used, or by moistening it with a spray of water or the like, if a moisture activated adhesive is used. It is important to note that the adhesive on a portion B of the security strip 38 is not activated at this time, either by precisely directing the heat or moisture to only the portion A to be activated, or by providing a blocking member 48 to block the heat or moisture from being directed to the portion B not to be activated. Once the adhesive on portion A of the security strip 38 is activated, the security strip 38 is passed along with web of stamps 22 through rollers 50 to adhere portion A of the security strip to web of stamps 22.

If web of stamps 22 is a web of moisture activated stamps, the process described above with respect to self-adhesive stamps having a protective backing layer may be employed. However, it is not required that security strip material 40 be provided on its surface facing web of stamps 22 with an adhesive. Instead, after security strip 38 is cut, the portion A of the security strip 38 to be adhered to the web of stamps 22, or the web of stamps itself in the area to be adjacent to portion A of the security strip 38, may be slightly moistened, in a pattern of spaced apart small dots, for example, and then the security strip 38 is passed along with web of stamps 22 trough rollers 50 to adhere portion A of the security strip to web of stamps 22. It is important to note that only a small portion of the adhesive on the web of stamps 22 should be activated, so that the end user of the stamps may remove them from the security strip 38 when desired, and affix them to an envelope in the usual fashion.

It should be appreciated that the length of security strip 38 may vary depending on the inner circumference of the coil of stamps to be produced, and that the relative lengths of portions A and B thereof may also vary, as discussed more fully below. However, it should also be appreciated that the portion B of security strip 38 which has not been adhered to the web of stamps 22 should be positioned such that it extends out beyond the first (i.e., the inner end stamp) in a coil to be produced. For example, and referring to FIG. 5, suppose stamp 52 will be the one hundredth stamp in a coil of one hundred stamps (i.e., the outer end stamp), and stamp 54 will be the first stamp in the next coil (i.e., the inner end stamp). It is important that the portion B, and only the portion B, of security strip 38 which has not been adhered to the web of stamps 22 should be positioned such that it extends out beyond stamp 54, because if portion A of security strip B extended out beyond stamp 54 and adhered to stamp 52, the coils of stamps would not be able to be properly separated (i.e., the stamps could not be easily separated between stamp 52 and stamp 54).

Figure 6:
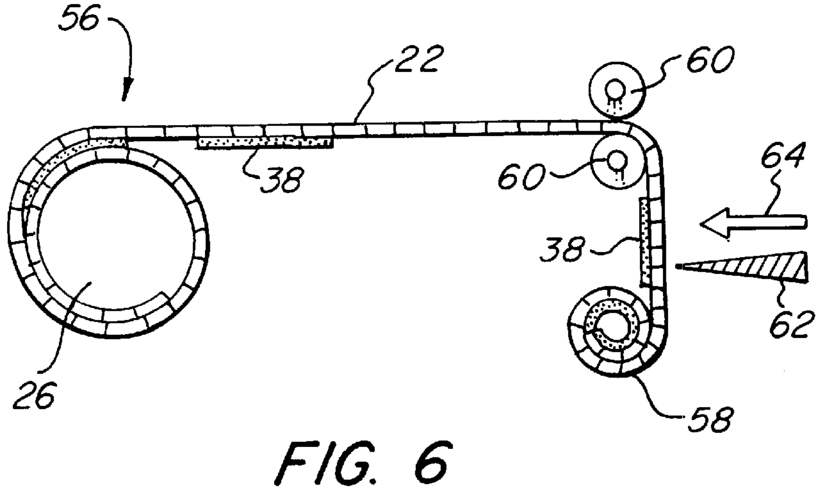
FIG. 6 is a side schematic view of a portion of the system for creating a coil of stamps of FIG. 3.
Figure 7:
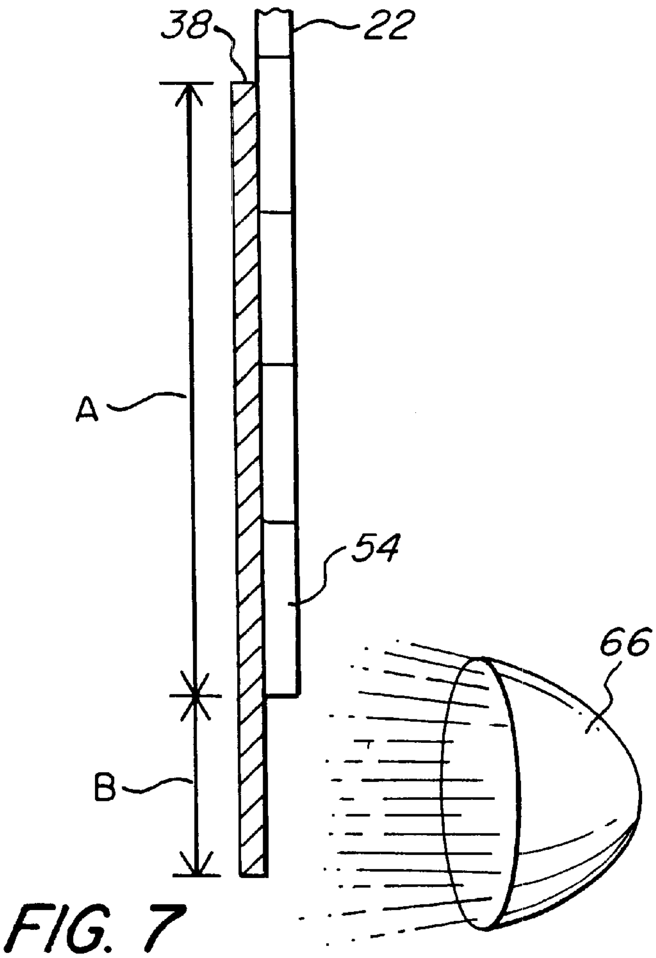
FIG. 7 is a side view illustrating the end of a strip of stamps before being rolled into a coil.

Referring now to FIG. 6, a mechanism 56 is shown for creating discrete coils of stamps from web of stamps 22. Web of stamps 22 may be fed to mechanism 56 directly from mechanism 20 (shown in FIG. 3), or as shown in FIG. 6, may first be wound into roll 26, and then later fed to mechanism 56. Web of stamps 22 is wound into a coil 58, and may be passed around rollers 60, such that web of stamps 22 is in moderate tension, and a bursting blade 62 is provided proximate to coil 58. Bursting blade 62 extends across the entire width of web of stamps 22, and has a narrow tip which may be sharp or rounded, and serrated or straight. Bursting blade 62 is movable substantially perpendicular to web of stamps 22 (indicated by arrow 64) and when moved fully toward web of stamps 22, breaks a plane formed thereby. Thus, after an appropriate number of stamps have passed by bursting blade 62, bursting blade 62 is moved forcefully toward web of stamps 22 at the appropriate time such that it strikes perforation 34 between the last stamp 52 in a coil (i.e., the outer end stamp), and the first stamp 54 in the next coil (i.e., the inner end stamp), thereby separating coil 58 from the remainder of web of stamps 22. While this break causes the web of stamps 22 to be severed, it does not cause such to happen to security strip 38, as security strip 38 is not perforated. As such, the non-adhered portion B of the security strip 38 extends out beyond the first stamp 54 in the next coil to be created (as illustrated in FIG. 7).

Figure 8:
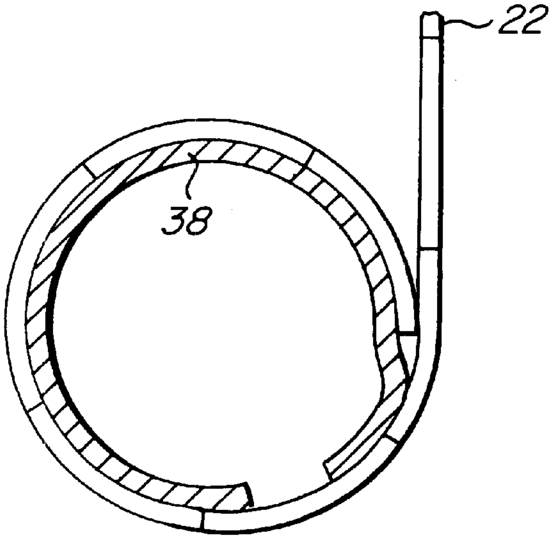
FIG. 8 is a side view illustrating the inner end of a strip of stamps as it is being rolled into a coil.

The now exposed portion B of the security strip 38 is activated as described above with respect to portion A of the security strip 38, by heating it with a heat lamp 66 (shown in FIG. 7) or the like, by moistening it with a spray of water or the like, or by slightly moistened it in a pattern of spaced apart small dots or the like, as appropriate. As shown in FIG. 8, the web of stamps 22 is then rolled into a coil, and now activated portion B of security strip adheres to the web of stamps 22 (shown in FIG. 8), or back onto itself (not shown). It should be noted that while the length of security strip 38 and the relative lengths of portions A and B thereof, may vary, it is desirable for optimal performance to dimension each of them such that when rolled into a coil, portion B of security strip 38 adheres to the web of stamps 22 (as shown in FIG. 8), rather than adhering to the security strip 38 itself, although the latter is also possible.

The present invention, therefore, provides a coil of stamps which inhibits the unnoticed and unauthorized removal of one or more stamps from the coil itself, either from the outer spires or from the inner spires, thus allowing, among other advantages, a plurality of coils to be packaged as a stick and wrapped on the outside with a shrink wrap tubing, while still ensuring the customer that no stamps were removed from any of the coil before being sold to the customer. A method of making such a coil of stamps is also provided.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for creating a coil of stamps from a web of stamps, which coil inhibits the unnoticed and unauthorized removal of one or more stamps from the coil, said system comprising:

a security strip feeder which feeds a security strip, the security strip comprising a first section and a second section;

a first activator which activates only the first section of the security strip;

an applicator which applies the security strip to contact the web of stamps, wherein the activated first section of the security strip adheres to the web of stamps, while the second section of the security strip does not adhere to the web of stamps;

a cutter which cuts the web of stamps into a strip of stamps in a position such that at least a portion of the second section extends beyond the strip of stamps;

a second activator which activates the portion of the second section of the security strip extending beyond the strip of stamps; and, a coiler which coils the strip of stamps into a coil of stamps such that the activated portion of the second section of the security strip contacts and adheres onto an inner spire of the coil of stamps or back onto itself.

2. The system of claim 1 wherein the security strip has a delayed reaction heat activated adhesive applied thereto, and wherein said first activator and said second activator comprise heat sources which activate the delayed reaction heat activated adhesive.

3. The system of claim 2 wherein the heat sources comprise heat sources selected from the group consisting of heat lamps, infrared heat sources and radiant heat sources.

4. The system of claim 1 wherein the security strip has a moisture activated adhesive applied thereto, and wherein said first activator and said second activator comprise moisture sources which activate the moisture activated adhesive.

5. The system of claim 1 wherein the web of stamps comprises a web of stamps having a moisture activated adhesive applied thereto, and wherein said first activator and said second activator comprise moisture sources which apply moisture to the security strip which moisture activates the moisture activated adhesive when the moistened security strip contacts the moisture activated adhesive.

6. The system of claim 1 wherein said security strip feeder includes a cutting mechanism which cuts the security strip from a length of security strip material.

7. The system if claim 1 wherein said first activator includes a blocking member which blocks the second portion of the security strip from being activated during activation of the first portion of the security strip.

8. The system of claim 1 wherein said cutter comprises:

a bursting blade extending across a width of the web of stamps, said bursting blade having a narrow tip and being movable substantially perpendicular to the web of stamps such that when moved fully toward the web of stamps, said bursting blade breaks a plane formed by the web of stamps; and wherein said bursting blade is moved forcefully toward the web of stamps adjacent to a perforation in the web of stamps in order to burst the perforation and separate a strip of stamps from the remainder of the web of stamps.

9. A system for creating a coil of stamps from a web of stamps having a pressure sensitive adhesive applied thereto which is covered by a backing layer, which coil inhibits the unnoticed and unauthorized removal of one or more stamps from the coil, said system comprising:

a security strip feeder which feeds a security strip, the security strip having an adhesive applied thereto and comprising a first section and a second section;

a first activator which activates the adhesive on only the first section of the security strip;

an applicator which applies the security strip to contact the web of stamps, wherein the activated adhesive on the first section of the security strip adheres to the web of stamps, while the adhesive on the second section of the security strip does not adhere to the web of stamps;

a cutter which cuts the web of stamps into a strip of stamps in a position such that at least a portion of the second section extends beyond the strip of stamps;

a second activator which activates the adhesive on the portion of the second section of the security strip extending beyond the strip of stamps; and, a coiler which coils the strip of stamps into a coil of stamps such that the activated portion of adhesive on the second section of the security strip contacts and adheres onto an inner spire of the coil of stamps or back onto itself.

10. The system of claim 9 wherein the adhesive applied to the security strip comprises a delayed reaction heat activated adhesive, and wherein said first activator and said second activator comprise heat sources which activate the delayed reaction heat activated adhesive.

11. The system of claim 10 wherein the heat sources heat sources selected from the group consisting of heat lamps, infrared heat sources and radiant heat sources.

12. The system of claim 9 wherein the adhesive applied to the security strip comprises a moisture activated adhesive, and wherein said first activator and said second activator comprise moisture sources which activate the moisture activated adhesive.

13. The system of claim 9 wherein said security strip feeder includes a cutting mechanism which cuts the security strip from a length of security strip material.

14. The system if claim 9 wherein said first activator includes a blocking member which blocks the second portion of the security strip from being activated during activation of the first portion of the security strip.

15. The system of claim 9 wherein said cutter comprises:

a bursting blade extending across a width of the web of stamps, said bursting blade having a narrow tip and being movable substantially perpendicular to the web of stamps such that when moved fully toward the web of stamps, said bursting blade breaks a plane formed by the web of stamps; and wherein said bursting blade is moved forcefully toward the web of stamps adjacent to a perforation in the web of stamps in order to burst the perforation and separate a strip of stamps from the remainder of the web of stamps.

16. A system for creating a coil of stamps from a web of stamps having a moisture activated adhesive applied thereto, which coil inhibits the unnoticed and unauthorized removal of one or more stamps from the coil, said system comprising:

a security strip feeder which feeds a security strip, the security strip comprising a first section and a second section;

a first activator which applies moisture to only the first section of the security strip;

an applicator which applies the security strip to contact the web of stamps, wherein the moisture applied to the first section of the security strip activates the moisture activated adhesive applied to the web of stamps to adhere the first section of the security strip to the web of stamps, while the second section of the security strip does not adhere to the web of stamps;

a cutter which cuts the web of stamps into a strip of stamps in a position such that at least a portion of the second section extends beyond the strip of stamps;

a second activator which applies moisture to the portion of the second section of the security strip extending beyond the strip of stamps; and, a coiler which coils the strip of stamps into a coil of stamps such that the moisture applied to the portion of the second section of the security strip contacts and activates the moisture activated adhesive applied to an inner spire of the coil of stamps, thereby adhering the second section of the security strip adheres to the inner spire of the coil of stamps.

17. The system of claim 16 wherein said security strip feeder includes a cutting mechanism which cuts the security strip from a length of security strip material.

18. The system if claim 16 wherein said first activator includes a blocking member which blocks the second portion of the security strip from being activated during activation of the first portion of the security strip.

19. The system of claim 16 wherein said cutter comprises:

a bursting blade extending across a width of the web of stamps, said bursting blade having a narrow tip and being movable substantially perpendicular to the web of stamps such that when moved fully toward the web of stamps, said bursting blade breaks a plane formed by the web of stamps; and wherein said bursting blade is moved forcefully toward the web of stamps adjacent to a perforation in the web of stamps in order to burst the perforation and separate a strip of stamps from the remainder of the web of stamps.

20. A method for creating a coil of stamps from a web of stamps, which coil inhibits the unnoticed and unauthorized removal of one or more stamps from the coil, said method comprising the steps of:

feeding a security strip, the security strip comprising a first section and a second section;

activating only the first section of the security strip;

applying the security strip to contact the web of stamps, wherein the activated first section of the security strip adheres to the web of stamps, while the second section of the security strip does not adhere to the web of stamps;

cutting the web of stamps into a strip of stamps in a position such that at least a portion of the second section extends beyond the strip of stamps;

activating the portion of the second section of the security strip extending beyond the strip of stamps; and, coiling the strip of stamps into a coil of stamps such that the activated portion of the second section of the security strip contacts and adheres onto an inner spire of the coil of stamps or back onto itself.

21. The method of claim 20 wherein the security strip has a delayed reaction heat activated adhesive applied thereto, and wherein said first activating and said second activating steps comprise the steps of heating the delayed reaction heat activated adhesive.

22. The method of claim 20 wherein the security strip has a moisture activated adhesive applied thereto, and wherein said first activating and said second activating steps comprise the steps of applying moisture to the moisture activated adhesive.

23. The method of claim 20 wherein the web of stamps comprises a web of stamps having a moisture activated adhesive applied thereto, and wherein said first activating and said second activating steps comprise the steps of applying moisture to the security strip which moisture activates the moisture activated adhesive when the moistened security strip contacts the moisture activated adhesive.

24. A method for creating a coil of stamps from a web of stamps having a pressure sensitive adhesive applied thereto which is covered by a backing layer, which coil inhibits the unnoticed and unauthorized removal of one or more stamps from the coil, said method comprising the steps of:

feeding a security strip, the security strip having an adhesive applied thereto and comprising a first section and a second section;

activating the adhesive on only the first section of the security strip;

applying the security strip to contact the web of stamps, wherein the activated adhesive on the first section of the security strip adheres to the web of stamps, while the adhesive on the second section of the security strip does not adhere to the web of stamps;

cutting the web of stamps into a strip of stamps in a position such that at least a portion of the second section extends beyond the strip of stamps;

activating the adhesive on the portion of the second section of the security strip extending beyond the strip of stamps; and, coiling the strip of stamps into a coil of stamps such that the activated portion of adhesive on the second section of the security strip contacts and adheres onto an inner spire of the coil of stamps or back onto itself.

25. The method of claim 24 wherein the adhesive applied to the security strip comprises a delayed reaction heat activated adhesive, and wherein said first activating and said second activating steps comprise the steps of heating the delayed reaction heat activated adhesive.

26. The method of claim 24 wherein the adhesive applied to the security strip comprises a moisture activated adhesive, and wherein said first activating and said second activating steps comprise the steps of applying moisture to the moisture activated adhesive.

27. A method for creating a coil of stamps from a web of stamps having a moisture activated adhesive applied thereto, which coil inhibits the unnoticed and unauthorized removal of one or more stamps from the coil, said method comprising the steps of:

feeding a security strip, the security strip comprising a first section and a second section;

applying moisture to only the first section of the security strip;

applying the security strip to contact the web of stamps, wherein the moisture applied to the first section of the security strip activates the moisture activated adhesive applied to the web of stamps to adhere the first section of the security strip to the web of stamps, while the second section of the security strip does not adhere to the web of stamps;

cutting the web of stamps into a strip of stamps in a position such that at least a portion of the second section extends beyond the strip of stamps;

applying moisture to the portion of the second section of the security strip extending beyond the strip of stamps; and, coiling the strip of stamps into a coil of stamps such that the moisture applied to the portion of the second section of the security strip contacts and activates the moisture activated adhesive applied to an inner spire of the coil of stamps, thereby adhering the second section of the security strip adheres to the inner spire of the coil of stamps.

* * * * *